(12) United States Patent
Schmidt

(10) Patent No.: US 11,351,516 B2
(45) Date of Patent: Jun. 7, 2022

(54) CHLORINE DIOXIDE GENERATION DEVICE AND PROCESS

(71) Applicant: William Schmidt, Fair Oaks, CA (US)

(72) Inventor: William Schmidt, Fair Oaks, CA (US)

(*) Notice: Subject to any disclaimer, the term of this patent is extended or adjusted under 35 U.S.C. 154(b) by 196 days.

(21) Appl. No.: 16/829,253

(22) Filed: Mar. 25, 2020

(65) Prior Publication Data
US 2021/0299626 A1    Sep. 30, 2021

(51) Int. Cl.
| | |
|---|---|
| *B01J 14/00* | (2006.01) |
| *B01J 19/00* | (2006.01) |
| *B01J 19/24* | (2006.01) |
| *A01N 59/00* | (2006.01) |
| *C01B 11/02* | (2006.01) |

(52) U.S. Cl.
CPC .............. *B01J 14/00* (2013.01); *A01N 59/00* (2013.01); *B01J 19/0013* (2013.01); *B01J 19/2415* (2013.01); *C01B 11/024* (2013.01); *B01J 2219/00186* (2013.01)

(58) Field of Classification Search
CPC . A01N 59/00; B01J 14/00; B01J 19/00; B01J 19/0006; B01J 19/0013; B01J 19/24; B01J 19/2415; B01J 2219/00; B01J 2219/00079; B01J 2219/00186; C01B 11/00–024
See application file for complete search history.

(56) References Cited

U.S. PATENT DOCUMENTS 4,247,531 A * 1/1981 Hicks .................... C01B 11/024
210/754

* cited by examiner

*Primary Examiner* — Natasha E Young
(74) *Attorney, Agent, or Firm* — Craig A. Simmermon

(57) ABSTRACT

A Venturi pump chlorine dioxide generation device with one or more special ninety-degree bends with half-spherical mixing stations including: at least one ninety-degree bend with two half-spherical mixing stations between the sodium hypochlorite introduction point and the acid source introduction point, at least two ninety-degree bends with two half-spherical mixing stations between the acid source point and the sodium chlorite introduction point, and at least two ninety-degree bends with two half-spherical mixing stations between the sodium chlorite introduction point and the vacuum chamber of the Venturi pump. Each ninety-degree bend with two half-spherical mixing stations is an elbow section of cylindrical conduit or pipe wherein the two outer segments of the ninety-degree bend each have a spherical shaped expansion area to create a half-spherical concave section inside the conduit or pipe.

6 Claims, 4 Drawing Sheets

CHLORINE DIOXIDE GENERATION DEVICE AND PROCESS

BACKGROUND OF THE INVENTION

1. Field of the Invention

This invention relates to a Venturi pump chlorine dioxide generation device and more specifically to a Venturi pump chlorine dioxide generation device with a plurality of ninety-degree bend sections with half-spherical mixing stations. The Venturi pump chlorine dioxide generation device of this invention includes at least one ninety-degree bend with two half-spherical mixing stations between the sodium hypochlorite introduction point and the acid source introduction point, at least two ninety-degree bends with two half-spherical mixing stations between the acid source point and the sodium chlorite introduction point, and at least two ninety-degree bends with two half-spherical mixing stations between the sodium chlorite introduction point and the vacuum chamber of the Venturi pump.

2. Description of Related Art

There are many Venturi pump chlorine dioxide generation devices in the prior art, however, there are none that use one or more special ninety-degree bends with half-spherical mixing stations throughout the design. There are no Venturi pump chlorine dioxide generation devices in the prior art that use at least one ninety-degree bend with two half-spherical mixing stations between the sodium hypochlorite introduction point and the acid source introduction point, at least two ninety-degree bends with two half-spherical mixing stations between the acid source point and the sodium chlorite introduction point, and at least two ninety-degree bends with two half-spherical mixing stations between the sodium chlorite introduction point and the vacuum chamber of the Venturi pump.

Each ninety-degree bend with two half-spherical mixing stations is a ninety-degree section or elbow section of cylindrical conduit or pipe wherein the two outer segments of the ninety-degree bend each have a spherical shaped expansion area to create a half-spherical concave section inside the conduit or pipe instead of the typical hollow cylindrical shape of conduit or pipe. Half spherical mixing stations cause fluid flowing through this section of conduit or pipe to experience chaotic mixing or chaotic advection, which substantially increases chlorine dioxide production and efficiency of the chlorine dioxide generation device.

BRIEF SUMMARY OF THE INVENTION

It is an aspect of chlorine dioxide generation device and process to include a Venturi pump chlorine dioxide generation device that generates aqueous chlorine dioxide solution from the process of chaotic mixing or chaotic advection of aqueous solutions of sodium chlorite, sodium hypochlorite, and acid.

It is an aspect of chlorine dioxide generation device and process to include multiple ninety-degree bends with two half-spherical mixing stations between the sodium hypochlorite introduction point and the acid source introduction point.

It is an aspect of chlorine dioxide generation device and process to include multiple ninety-degree bends with two half-spherical mixing stations between the acid source point and the sodium chlorite introduction point.

It is an aspect of chlorine dioxide generation device and process to include multiple ninety-degree bends with two half-spherical mixing stations between the sodium chlorite introduction point and the vacuum chamber of the Venturi pump.

It is an aspect of chlorine dioxide generation device and process to yield the largest percentage of chlorine dioxide is an aqueous chlorine dioxide solution of any currently known Venturi pump chlorine dioxide generation device in the prior art at this time.

DEFINITION LIST

Figure 1A:
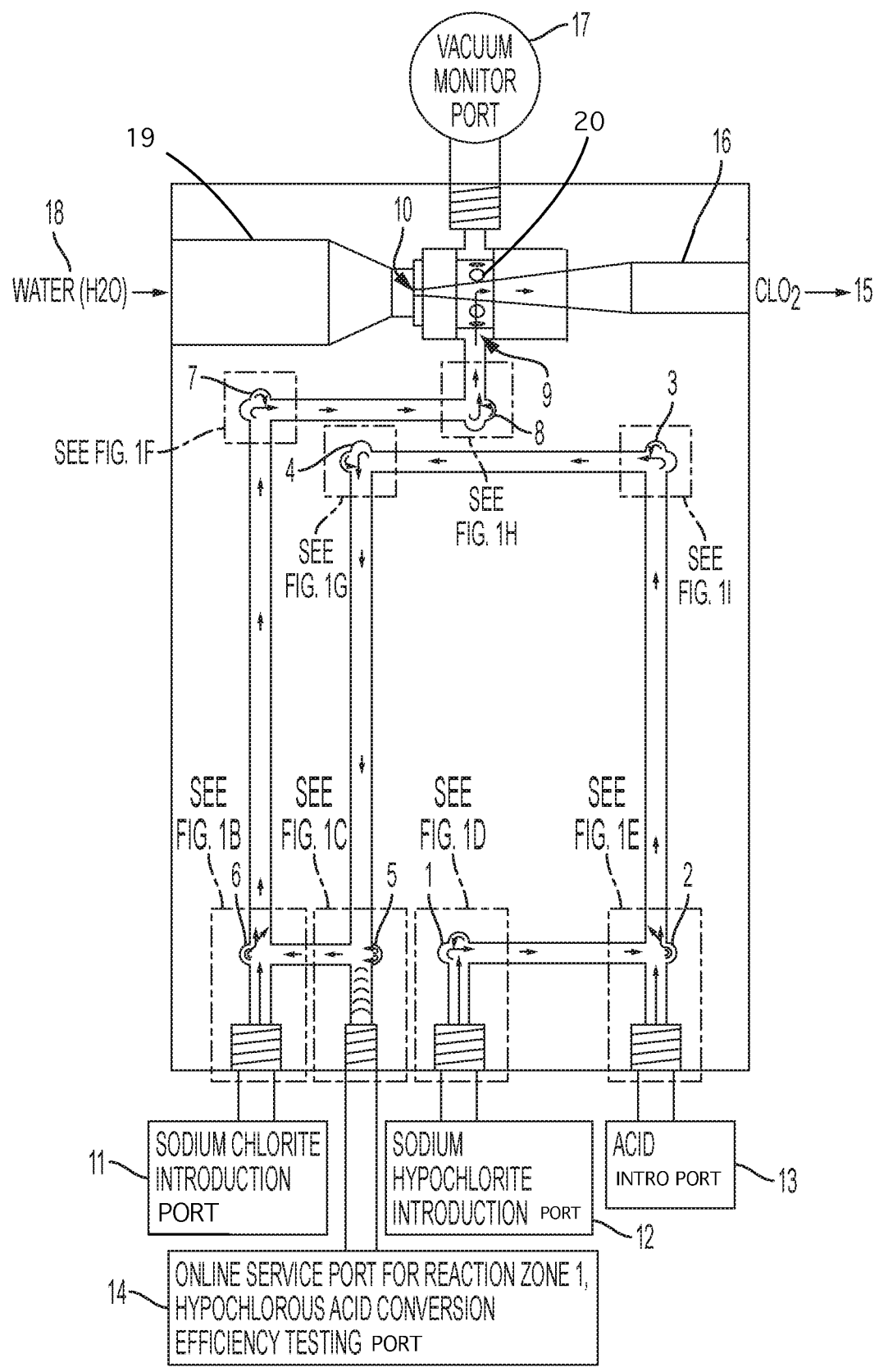
FIG. 1A is a lateral cross sectional view of chlorine dioxide generation device depicting all flow channels of the device.
Figure 1B:
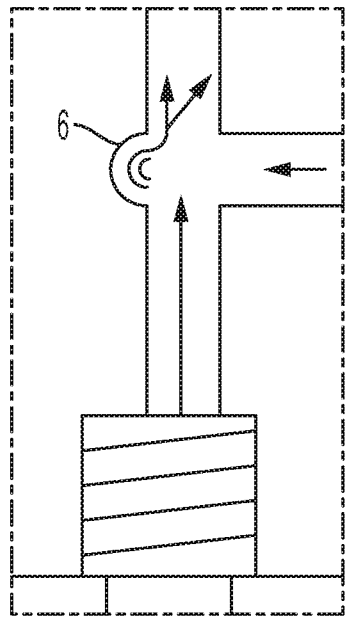
FIG. 1B is an enlarged view of third T-fitting/conduit with half-spherical mixing station.
Figure 1C:
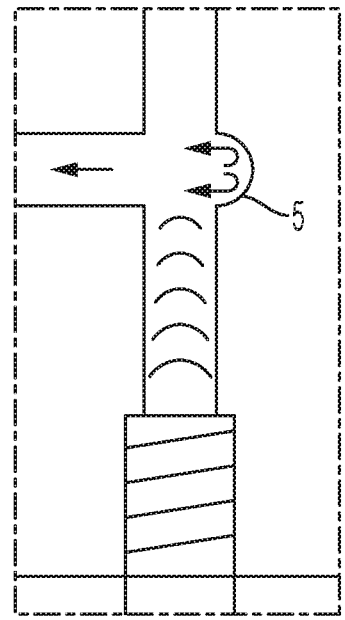
FIG. 1C is an enlarged view of second T-fitting/conduit with half-spherical mixing station.
Figure 1D:
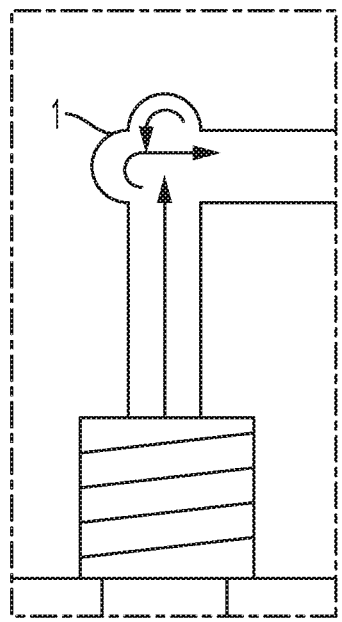
FIG. 1D is an enlarged view of first ninety-degree fitting/conduit with two half-spherical mixing stations.
Figure 1E:
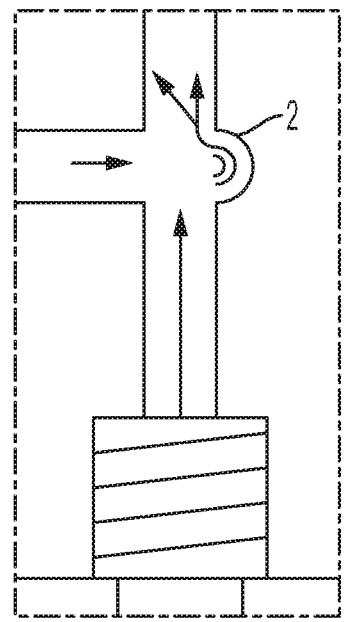
FIG. 1E is an enlarged view of first T-fitting/conduit with half-spherical mixing station.
Figure 1F:
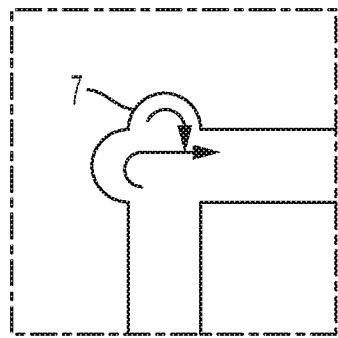
FIG. 1F is an enlarged view of fourth ninety-degree fitting/conduit with two half-spherical mixing stations.
Figure 1G:
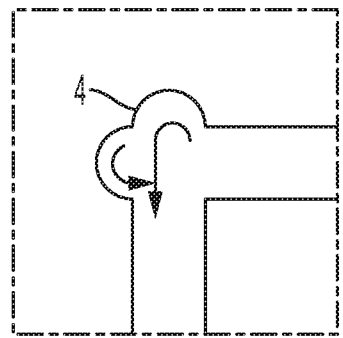
FIG. 1G is an enlarged view of third ninety-degree fitting/conduit with two half-spherical mixing stations.
Figure 1H:
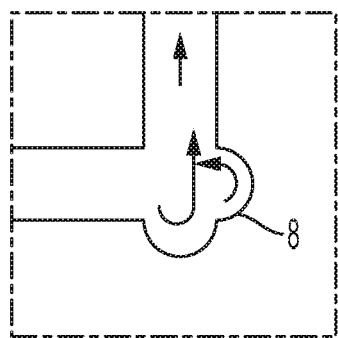
FIG. 1H is an enlarged view of fifth ninety-degree fitting/conduit with two half-spherical mixing stations.
Figure 1I:
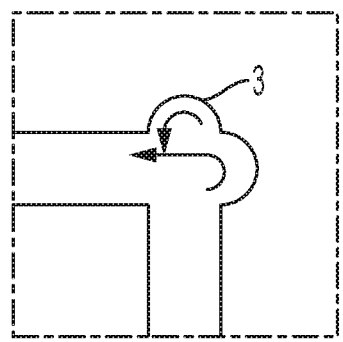
FIG. 1I is an enlarged view of second ninety-degree fitting/conduit with two half-spherical mixing stations.
Figure 2:
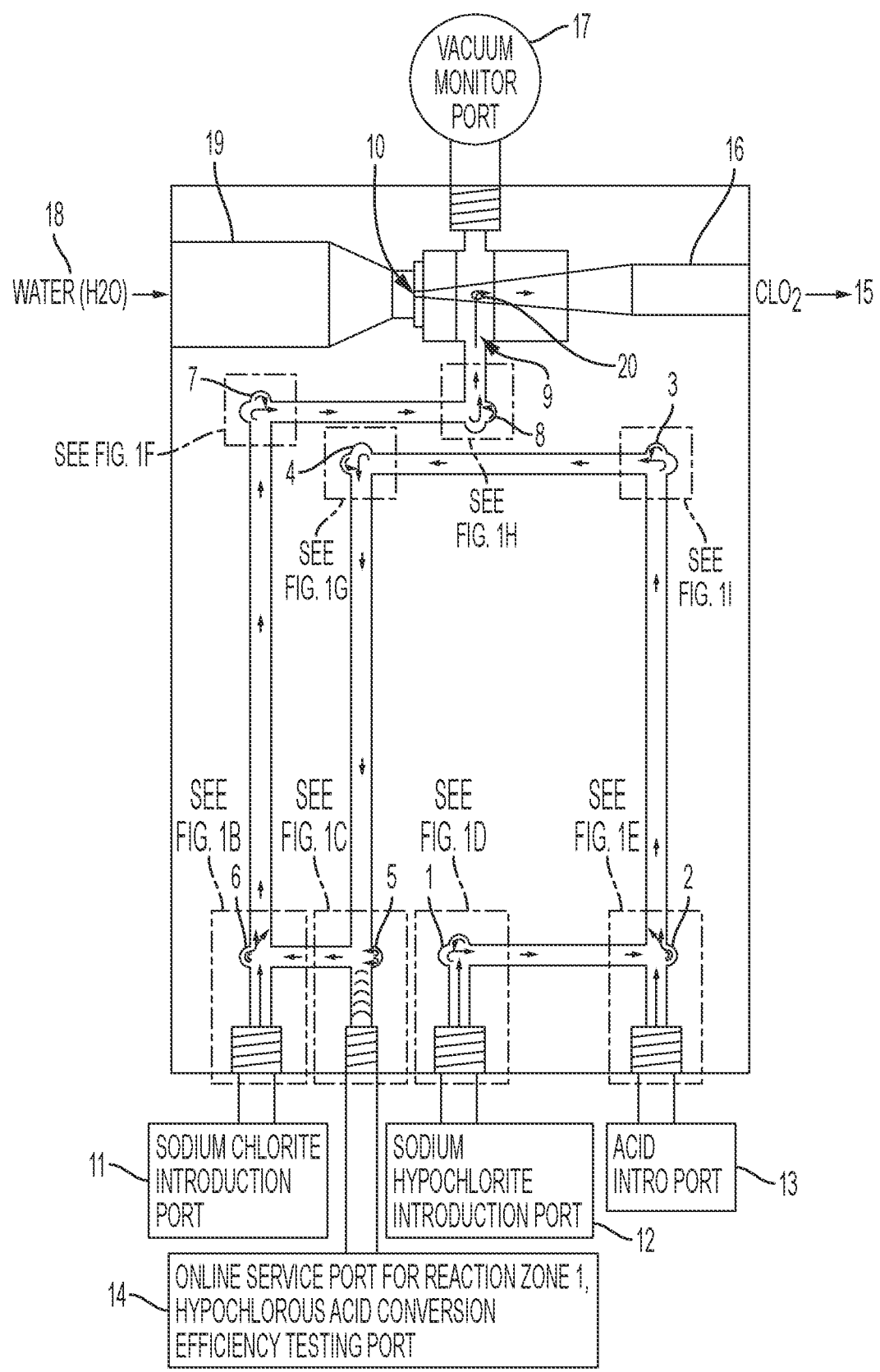
FIG. 2 is a lateral cross sectional view of chlorine dioxide generation device depicting all flow channels of the device.

| Term | Definition |
| --- | --- |
| 1 | First Ninety-Degree Fitting/Conduit with Two Half-Spherical Mixing Stations |
| 2 | First T-Fitting/Conduit with Half-Spherical Mixing Station |
| 3 | Second Ninety-Degree Fitting/Conduit with Two Half-Spherical Mixing Stations |
| 4 | Third Ninety-Degree Fitting/Conduit with Two Half-Spherical Mixing Stations |
| 5 | Second T-Fitting/Conduit with Half-Spherical Mixing Station |
| 6 | Third T-Fitting/Conduit with Half-Spherical Mixing Station |
| 7 | Fourth Ninety-Degree Fitting/Conduit with Two Half-Spherical Mixing Stations |
| 8 | Fifth Ninety-Degree Fitting/Conduit with Two Half-Spherical Mixing Stations |
| 9 | Vacuum Chamber |
| 10 | Input Nozzle Orifice |
| 11 | Sodium Chlorite Introduction Point |
| 12 | Sodium Hypochlorite Introduction Point |
| 13 | Acid Introduction Port |
| 14 | Testing/Service Port |
| 15 | Chlorine Dioxide Aqueous Solution |
| 16 | Diffuser Nozzle |
| 17 | Vacuum Monitor Port |
| 18 | Water |
| 19 | Input Nozzle |
| 20 | Vacuum Chamber Orifice |
| 100 | Chlorine Dioxide Generation Device |

DETAILED DESCRIPTION OF THE INVENTION

Chlorine dioxide has the chemical formula $ClO_2$. Chlorine dioxide is a yellow brown gas at room temperature and pressure. Chlorine dioxide is a potent and useful oxidizing agent that readily dissolves in water wherein aqueous solutions of chlorine dioxide are very useful as a disinfectant with food processing, food cleaning, food packaging, food handling, water treatment, and any type of bleaching. At the same time, chlorine dioxide is a very unstable compound that very readily separates from solution and solvents and also decomposes extremely violently after separation. Chlorine dioxide is a highly reactive oxidant and for all practical purposes will not remain dissolved in solution or otherwise contained in gas form for any extended length of time in any type of container. The chlorine dioxide will simply come out of solution and then explode. Consequently, chlorine dioxide is very typically generated on site, on demand, at the time of use, during the food processing, food cleaning, food packaging, food handling, water treatment, and any type of bleaching in order to eliminate the need to store the extremely volatile gas.

One of the best methods to produce chlorine dioxide on-demand is by Venturi pump chlorine dioxide generator because water can be used as the motive fluid in the Venturi pump and also as the solvent in the chemical production process to dissolve the chlorine dioxide. In this way, water efficiently performs two functions with a Venturi pump chlorine dioxide generator. There are Venturi pump chlorine dioxide generators in the prior art such as U.S. Pat. Nos. 4,247,531 and 4,590,057. This Venturi pump chlorine dioxide generator of this invention differs from all other Venturi pump chlorine dioxide generators because it has specially shaped and designed flow channels or conduits with special internal geometry to create high intensity turbulence in the pump fluid to yield substantially increased chlorine dioxide production above all other Venturi pump chlorine dioxide generators.

Chlorine dioxide generation device 100 uses an educator or Venturi pump to pull reactants through a complex plurality of mixing stations prior to ejecting the mixed reactants into a continuous flow of water. An eductor is a kind of jet pump that does not have any moving parts but uses the Venturi effect to pump a liquid or gas. An eductor has an input nozzle, a vacuum port, a diffuser nozzle, a motive fluid, and a pump fluid. An eductor uses the motive fluid to pump the pump fluid. The motive fluid must be continuously pumped through the eductor for the Venture pump to function. Motive fluid is pumped into the input nozzle by a pump (not depicted). Input nozzle is a nozzle that tappers tapers inward along the direction of flow to a small hole or orifice that constricts the flow of the motive fluid and causes the motive fluid to increase in velocity as it passes through the input nozzle and small hole or orifice. Thus, the velocity of the motive fluid is increases as it passes through the input nozzle and small hole or orifice. This in turn causes the pressure of the motive fluid to decrease due to the Bernoulli principle. The input nozzle ejects motive fluid from the small hole or orifice into the diffuser nozzle. Diffuser nozzle is a nozzle that tappers tapers outward along the direction of flow to gradually expand the restricted area and expand the flow of the motive fluid which causes the motive fluid to decrease in velocity as it passes through the diffuser nozzle. The velocity of the motive fluid decreases as it passes through the diffuser nozzle, which causes the pressure of the motive fluid to increase due to the Bernoulli principle. Thus, the motive fluid has a lower pressure at and near the constricted area and orifice than it does on either side of the constricted area and orifice. Vacuum port is a port or opening in the diffuser nozzle just downstream of the small hole or orifice. Vacuum port is plumbed to the pump fluid or connected to the pump fluid by conduit, pipe, hose, tubing, or duct. Since there is a lower pressure at the location of the vacuum port due to the Bernoulli principle, the diffuser nozzle essentially pulls or sucks the pump fluid into the stream of the motive fluid thereby pumping the pump fluid out through the diffuser nozzle along with the motive fluid. An eductor pump or Venturi pump is commonly known within the art of pumps or fluid mechanics.

In the case of this invention, the motive fluid is water and the pump fluid is a special blend of three liquid ingredients used to make chlorine dioxide. The ingredients are mixed in a very special way prior to entering a vacuum chamber where chlorine dioxide gas boils out of the pump fluid or evaporates from the pump fluid and re-dissolves into the motive fluid to create a very potent solution of aqueous chlorine dioxide ejecting from the diffuser nozzle that may be readily used to disinfect food, water, or other substance. Chlorine dioxide generation device 100 has an input nozzle 19 and a diffuser nozzle 16. Water 18 is pumped into the input nozzle 19. Aqueous chlorine dioxide 15 flows out of diffuser nozzle 16. Chlorine dioxide generation device 100 does not have any moving parts where the chlorine dioxide generation device 100 functions by pumping water 18 through the device. In order for chlorine dioxide generation device 100 to function, water 18 must continuously flow through the device. Water 18 enters through input nozzle 19, flows through an input nozzle orifice 10, where it dissolves or absorbs chlorine dioxide, and then flows out of diffuser nozzle 16. Water is forced through the input nozzle orifice 10 where it is constricted or choked thereby causing the velocity the water to increase as it passes through the constricted section or choke section, which in turn causes a decrease in pressure of the water. Just downstream from the input nozzle orifice 10, in the diffuser nozzle 16, there is a plurality of vacuum chamber orifices 20 that are connected to a vacuum chamber 9. The increased velocity water experiences lower pressure at the vacuum chamber orifices 20 and creates a vacuum in the vacuum chamber 9 causing a suction effect where the vacuum chamber 9 sucks or pulls the motive fluid into the stream of the water, thereby sucking or pulling the motive fluid from the vacuum chamber 9, through the vacuum chamber orifices 20, and into the water flow path in the diffuser nozzle 16.

In best mode, chlorine dioxide generation device 100 is a rigid block of material with a complex plurality of conduits, flow channels, piping, pipework, hose, tubing, duct, or ductwork, installed or otherwise contained inside of the rigid block. This helps make the device tamper resistant and dependable. Conduits, flow channels, piping, pipework, hose, tubing, duct, or ductwork may be machined directly into the rigid block of material. The rigid block with conduits, flow channels, piping, pipework, hose, tubing, duct, or ductwork may be created in one whole structure by three-dimensional printing. Conduits, flow channels, piping, pipework, hose, tubing, duct, or ductwork may be stamped, molded, or cast in halves that are attached together to make the rigid block. Chlorine dioxide generation device 100 may be made of any known rigid material such as plastic, polymer, graphite, ceramic, glass, metal, composite, foam, or other.

The applicant has conducted extensive research, development, and experimentation to optimize the design and components of the flow path of the motive fluid in the eductor or Venturi chlorine dioxide generation device to yield the maximum percentage of chlorine dioxide or maximum production of chlorine dioxide by the eductor or Venturi pump. The following design is the result this extensive research, development, and experimentation, which yields the maximum percentage of chlorine dioxide or maximum production of chlorine dioxide by any eductor or Venturi pump chlorine dioxide generation device in the prior art.

Chlorine dioxide generation device 100 comprises: a sodium hypochlorite introduction port 12; a first length of cylindrical conduit, flow channel, pipe, hose, tubing, or duct; a first ninety-degree fitting/conduit with two half-spherical mixing stations 1; a second length of cylindrical conduit, flow channel, pipe, hose, tubing, or duct; an acid introduction port 13; a third length of cylindrical conduit, flow channel, pipe, hose, tubing, or duct; a first T-fitting/conduit with half-spherical mixing station 2; a fourth length of cylindrical conduit, flow channel, pipe, hose, tubing, or duct; a second ninety-degree fitting/conduit with two half-spherical mixing stations 3; a fifth length of cylindrical conduit, flow channel, pipe, hose, tubing, or duct; a third ninety-fitting/conduit with two half-spherical mixing stations 4; a sixth length of cylindrical conduit, flow channel, pipe, hose, tubing, or duct; a second T-fitting/conduit with half-spherical mixing station 5; a seventh length of cylindrical conduit, flow channel, pipe, hose, tubing, or duct; a testing/service port 14; an eighth length of cylindrical conduit, flow channel, pipe, hose, tubing, or duct; a third T-fitting/conduit with half-spherical mixing station 6; a ninth length of cylindrical conduit, flow channel, pipe, hose, tubing, or duct; a sodium chlorite introduction port 11; a tenth length of cylindrical conduit, flow channel, pipe, hose, tubing, or duct; a fourth ninety-degree fitting/conduit with two half-spherical mixing station 7; an eleventh length of cylindrical conduit, flow channel, pipe, hose, tubing, or duct; a fifth ninety-degree fitting/conduit with two half-spherical mixing station 8; an input nozzle 19; input nozzle orifice 10; a diffuser nozzle 16; and at least one vacuum chamber orifice 20.

The first length of cylindrical conduit, flow channel, pipe, hose, tubing, or duct is a length of cylindrical conduit, flow channel, pipe, hose, tubing, or duct with a first end and a second end.

Sodium hypochlorite introduction port 12 is a port or opening to the first length of cylindrical conduit, flow channel, pipe, hose, tubing, or duct. Sodium hypochlorite introduction port 12 is a male threaded member or a female threaded member connected to the first end of the first length of cylindrical conduit, flow channel, pipe, hose, tubing, or duct so that fluid may freely flow between these members without leaking. Sodium hypochlorite introduction port 12 functions as a connection port to connect to a tank of aqueous sodium hypochlorite solution (not depicted) through one or more lengths of conduit, flow channel, pipe, hose, tubing, or duct (not depicted). Any known type of aqueous sodium hypochlorite solution may be used. Any known concentration of aqueous sodium hypochlorite solution may be used. Aqueous sodium hypochlorite solution is required for the chlorine dioxide generation device 100 to function. The act of pumping water into the input nozzle 19 causes aqueous sodium hypochlorite solution to flow into sodium hypochlorite introduction port 12.

First ninety-degree fitting/conduit with two half-spherical mixing stations 1 is an elbow shaped or L-shaped fitting or section of cylindrical conduit, flow channel, pipe, hose, tubing, or duct with a ninety-degree bend. First ninety-degree fitting/conduit with two half-spherical mixing stations 1 has a first end, a second end, an interior surface, and an exterior surface. Being an elbow shape or L-shape, there is a ninety-degree bend on one side and a two hundred seventy degree bend on the other side to make the elbow shape or L-shape. The two segments of the elbow shape or L-shape on the two hundred seventy degree bend side each have a half-spherical shaped expansion area or dome-shaped expansion area on the inner surface of the cylindrical conduit, flow channel, pipe, hose, tubing, or duct to create a half-spherical concave section on the inner surface of the cylindrical conduit, flow channel, pipe, hose, tubing, or duct, as depicted. Rather than the typical straight cylindrical shaped flow channel that makes a ninety-degree bend, the two outer segments of the first ninety-degree fitting/conduit with two half-spherical mixing stations 1 each have a half-spherical shaped expansion area or dome-shaped expansion area on the inner surface. These two half-spherical shaped expansion areas or dome-shaped expansion areas cause fluid flowing there through to experience chaotic mixing or chaotic advection, whereas without these two half-spherical shaped expansion areas or dome-shaped expansion areas, fluid flowing there through would not experience chaotic mixing or chaotic advection and would only reach a laminar flow level or at best a turbulent flow level.

Laminar flow is characterized by fluid particles following in smooth paths in layers, with each layer moving smoothly past the adjacent layers with little or no mixing between layers. With laminar flow, fluid tends to flow without lateral mixing where adjacent layers slide past one another without mixing with each other. There are no cross currents running perpendicular to the direction of flow of fluid. In laminar flow, the motion of the particles of the fluid is very orderly with particles moving in straight lines parallel to the surface of the flow channel or conduit.

Turbulent flow is more agitated flow caused by excessive kinetic energy in the fluid flow that overcomes the damping effect of the fluid's viscosity. Turbulent flow has vortices, eddies, or swirls that appear and interact with each other to create drag forces and increased mixing between adjacent layers of fluid. In this state of flow, there are two degrees of freedom or motion where fluid flows longitudinally or parallel to flow channel or conduit and also flows or mixes laterally in a direction perpendicular to the to the longitudinal flow. Turbulent flow requires more energy, pumping force, or pressure than that required for laminar flow.

Chaotic mixing or chaotic advection is an even more agitated flow where complex fractals develop from the action of the fluid flow. A fractal is a complex and extended nautilus-shaped vortex, eddy, or swirl that curls and extends into infinity. Chaotic mixing or chaotic advection adds a third degree of freedom or motion where the fluid flows or mixes within fluid layers in a direction perpendicular to both the longitudinal laminar flow and the lateral turbulent flow. Thus, chaotic mixing or chaotic advection causes flow between fluid layers and among fluid layers. Again, turbulent flow has two degrees of freedom while chaotic mixing or chaotic advection has three degrees of freedom. Chaotic mixing or chaotic advection requires more energy, pumping force, or pressure than that required for turbulent flow. The theory of chaotic mixing or chaotic advection is not completely understood to the point of we can determine the exact mathematical representation of fluid particles undergoing chaotic mixing or chaotic advection, hence its characterization by the word "chaotic". At any rate, chaotic mixing or chaotic advection causes exponentially more fluid mixing and turbulence than laminar and turbulent flow. The plurality of ninety-degree fitting/conduit with two half-spherical mixing stations is the key or causation of the chaotic mixing or chaotic advection.

The second length of cylindrical conduit, flow channel, pipe, hose, tubing, or duct is a length of cylindrical conduit, flow channel, pipe, hose, tubing, or duct with a first end and a second end.

The first end of the first ninety-degree fitting/conduit with two half-spherical mixing stations 1 is connected to the second end of the first length of cylindrical conduit, flow channel, pipe, hose, tubing, or duct so that fluid may freely flow between these members without leaking.

The second end of the first ninety-degree fitting/conduit with two half-spherical mixing stations 1 is connected to the first end of the second length of cylindrical conduit, flow channel, pipe, hose, tubing, or duct so that fluid may freely flow between these members without leaking.

Acid introduction port 13 is a port or opening to the third length of cylindrical conduit, flow channel, pipe, hose, tubing, or duct. The third length of cylindrical conduit, flow channel, pipe, hose, tubing, or duct is a length of cylindrical conduit, flow channel, pipe, hose, tubing, or duct with a first end and a second end. Acid introduction port 13 is a male threaded member or a female threaded member connected to the first end of the third length of cylindrical conduit, flow channel, pipe, hose, tubing, or duct so that fluid may freely flow between these members without leaking. Acid introduction port 13 functions as a connection port to connect to a tank of aqueous acid solution (not depicted) through one or more lengths of conduit, flow channel, pipe, hose, tubing, or duct (not depicted). Any known type of aqueous acid solution may be used. Any known concentration of aqueous acid solution may be used. Aqueous acid solution is required for the chlorine dioxide generation device 100 to function. The act of pumping water into the input nozzle 19 causes aqueous acid solution to flow into acid introduction port 13.

First T-fitting/conduit with half-spherical mixing station 2 is a T-shaped fitting or section of cylindrical conduit, flow channel, pipe, hose, tubing, or duct with a base end, a first end, a second end, an interior surface, and an exterior surface. The base end is the bottom end or base end of the T-shape. The first and second ends are the upper ends of the T-shape. Thus, there is a ninety-degree bend between the base end and the first end and there is a ninety-degree bend between the base end and the second end. There is a one hundred eighty degree bend between the first end and the second end. In between the first and second ends of the first T-fitting/conduit with half-spherical mixing station 2, on the one hundred eighty degree bend side, on the outside of the junction point, there is a half-spherical shaped expansion area or dome-shaped expansion area on the inner surface of the cylindrical conduit, flow channel, pipe, hose, tubing, or duct to create a half-spherical concave section on the inner surface of the cylindrical conduit, flow channel, pipe, hose, tubing, or duct, as depicted. Rather than the typical straight cylindrical shaped flow channel, there is a half-spherical shaped expansion area or dome-shaped expansion area. This half-spherical shaped expansion area or dome-shaped expansion area causes fluid flowing there through to experience chaotic mixing or chaotic advection, whereas without this half-spherical shaped expansion area or dome-shaped expansion area, fluid flowing there through would not experience chaotic mixing or chaotic advection and would only reach a laminar flow level or at best a turbulent flow level.

The fourth length of cylindrical conduit, flow channel, pipe, hose, tubing, or duct is a length of cylindrical conduit, flow channel, pipe, hose, tubing, or duct with a first end and a second end.

The base end of first T-fitting/conduit with half-spherical mixing station 2 is connected to the second end of the second length of cylindrical conduit, flow channel, pipe, hose, tubing, or duct so that fluid may freely flow between these members without leaking.

The first end of first T-fitting/conduit with half-spherical mixing station 2 is connected to the first end of the fourth length of cylindrical conduit, flow channel, pipe, hose, tubing, or duct so that fluid may freely flow between these members without leaking.

The second end of first T-fitting/conduit with half-spherical mixing station 2 is connected to the second end of the third length of cylindrical conduit, flow channel, pipe, hose, tubing, or duct so that fluid may freely flow between these members without leaking.

Second ninety-degree fitting/conduit with two half-spherical mixing stations 3 is an elbow shaped or L-shaped fitting or section of cylindrical conduit, flow channel, pipe, hose, tubing, or duct with a ninety-degree bend.

Second ninety-degree fitting/conduit with two half-spherical mixing stations 3 has a first end, a second end, an interior surface, and an exterior surface. Since there is a ninety-degree bend on one side, there is a two hundred seventy degree bend on the other side. The two segments of the elbow shape or L-shape on the two hundred seventy degree bend side each have a half-spherical shaped expansion area or dome-shaped expansion area on the inner surface of the cylindrical conduit, flow channel, pipe, hose, tubing, or duct to create a half-spherical concave section on the inner surface of the cylindrical conduit, flow channel, pipe, hose, tubing, or duct, as depicted. Rather than the typical straight cylindrical shaped flow channel that makes a ninety-degree bend, the two outer segments of the second ninety-degree fitting/conduit with two half-spherical mixing stations 3 each have a half-spherical shaped expansion area or dome-shaped expansion area. These two half-spherical shaped expansion areas or dome-shaped expansion areas cause fluid flowing there through to experience chaotic mixing or chaotic advection, whereas without these two half-spherical shaped expansion areas or dome-shaped expansion areas, fluid flowing there through would not experience chaotic mixing or chaotic advection and would only reach a laminar flow level or at best a turbulent flow level.

The fifth length of cylindrical conduit, flow channel, pipe, hose, tubing, or duct is a length of cylindrical conduit, flow channel, pipe, hose, tubing, or duct with a first end and a second end.

The first end of the second ninety-degree fitting/conduit with two half-spherical mixing stations 3 is connected to the second end of the fourth length of cylindrical conduit, flow channel, pipe, hose, tubing, or duct so that fluid may freely flow between these members without leaking.

The second end of the second ninety-degree fitting/conduit with two half-spherical mixing stations 3 is connected to the first end of the fifth length of cylindrical conduit, flow channel, pipe, hose, tubing, or duct so that fluid may freely flow between these members without leaking.

Third ninety-degree fitting/conduit with two half-spherical mixing stations 4 is an elbow shaped or L-shaped fitting or section of cylindrical conduit, flow channel, pipe, hose, tubing, or duct with a ninety-degree bend. Third ninety-degree fitting/conduit with two half-spherical mixing stations 4 has a first end, a second end, an interior surface, and an exterior surface. Since there is a ninety-degree bend on one side, there is a two hundred seventy degree bend on the other side. The two segments of the elbow shape or L-shape on the two hundred seventy degree bend side each have a half-spherical shaped expansion area or dome-shaped expansion area on the inner surface of the cylindrical conduit, flow channel, pipe, hose, tubing, or duct to create a half-spherical concave section on the inner surface of the cylindrical conduit, flow channel, pipe, hose, tubing, or duct, as depicted. Rather than the typical straight cylindrical shaped flow channel that makes a ninety-degree bend, the two outer segments of the third ninety-degree fitting/conduit with two half-spherical mixing stations 4 each have a half-spherical shaped expansion area or dome-shaped expansion area. These two half-spherical shaped expansion areas or dome-shaped expansion areas cause fluid flowing there through to experience chaotic mixing or chaotic advection, whereas without these two half-spherical shaped expansion areas or dome-shaped expansion areas, fluid flowing there through would not experience chaotic mixing or chaotic advection and would only reach a laminar flow level or at best a turbulent flow level.

The sixth length of cylindrical conduit, flow channel, pipe, hose, tubing, or duct is a length of cylindrical conduit, flow channel, pipe, hose, tubing, or duct with a first end and a second end.

The first end of the third ninety-degree fitting/conduit with two half-spherical mixing stations 4 is connected to the second end of the fifth length of cylindrical conduit, flow channel, pipe, hose, tubing, or duct so that fluid may freely flow between these members without leaking.

The second end of the third ninety-degree fitting/conduit with two half-spherical mixing stations 4 is connected to the first end of the sixth length of cylindrical conduit, flow channel, pipe, hose, tubing, or duct so that fluid may freely flow between these members without leaking.

Second T-fitting/conduit with half-spherical mixing station 5 is a T-shaped fitting or section of cylindrical conduit, flow channel, pipe, hose, tubing, or duct with a base end, a first end, a second end, an interior surface, and an exterior surface. The base end is the bottom end or base end of the T-shape. The first and second ends are the upper ends of the T-shape. Thus, there is a ninety-degree bend between the base end and the first end and there is a ninety-degree bend between the base end and the second end. There is a one hundred eighty degree bend between the first end and the second end. In between the first and second ends of the second T-fitting/conduit with half-spherical mixing station 5, on the one hundred eighty degree bend side, on the outside of the junction point, there is a half-spherical shaped expansion area or dome-shaped expansion area on the inner surface of the cylindrical conduit, flow channel, pipe, hose, tubing, or duct to create a half-spherical concave section on the inner surface of the cylindrical conduit, flow channel, pipe, hose, tubing, or duct, as depicted. Rather than the typical straight cylindrical shaped flow channel, there is a half-spherical shaped expansion area or dome-shaped expansion area. This half-spherical shaped expansion area or dome-shaped expansion area causes fluid flowing there through to experience chaotic mixing or chaotic advection, whereas without this half-spherical shaped expansion area or dome-shaped expansion area, fluid flowing there through would not experience chaotic mixing or chaotic advection and would only reach a laminar flow level or at best a turbulent flow level.

The seventh length of cylindrical conduit, flow channel, pipe, hose, tubing, or duct is a length of cylindrical conduit, flow channel, pipe, hose, tubing, or duct with a first end and a second end.

The eight length of cylindrical conduit, flow channel, pipe, hose, tubing, or duct is a length of cylindrical conduit, flow channel, pipe, hose, tubing, or duct with a first end and a second end.

Testing/service port 14 is a port or opening to the seventh length of cylindrical conduit, flow channel, pipe, hose, tubing, or duct. Testing/service port 14 is a male threaded member or a female threaded member connected to the first end of the seventh length of cylindrical conduit, flow channel, pipe, hose, tubing, or duct so that fluid may freely flow between these members without leaking. Testing/service port 14 functions as a connection port to connect to a measuring instrument (not depicted). Measuring instrument could be a device to test: hypochlorous acid conversion efficiency, pH, alkalinity, temperature, pressure, or any other known type of measurement by any known type of device. No testing or device is required at testing/service port 14 for the chlorine dioxide generation device 100 to function.

The base end of second T-fitting/conduit with half-spherical mixing station 5 is connected to the first end of the eight length of cylindrical conduit, flow channel, pipe, hose, tubing, or duct so that fluid may freely flow between these members without leaking.

The first end of second T-fitting/conduit with half-spherical mixing station 5 is connected to the second end of the sixth length of cylindrical conduit, flow channel, pipe, hose, tubing, or duct so that fluid may freely flow between these members without leaking.

The second end of second T-fitting/conduit with half-spherical mixing station 5 is connected to the second end of the seventh length of cylindrical conduit, flow channel, pipe, hose, tubing, or duct so that fluid may freely flow between these members without leaking.

Third T-fitting/conduit with half-spherical mixing station 6 is a T-shaped fitting or section of cylindrical conduit, flow channel, pipe, hose, tubing, or duct with a base end, a first end, a second end, an interior surface, and an exterior surface. The base end is the bottom end or base end of the T-shape. The first and second ends are the upper ends of the T-shape. Thus, there is a ninety-degree bend between the base end and the first end and there is a ninety-degree bend between the base end and the second end. There is a one hundred eighty degree bend between the first end and the second end. In between the first and second ends of the third T-fitting/conduit with half-spherical mixing station 6, on the one hundred eighty degree bend side, on the outside of the junction point, there is a half-spherical shaped expansion area or dome-shaped expansion area on the inner surface of the cylindrical conduit, flow channel, pipe, hose, tubing, or duct to create a half-spherical concave section on the inner surface of the cylindrical conduit, flow channel, pipe, hose, tubing, or duct, as depicted. Rather than the typical straight cylindrical shaped flow channel, there is a half-spherical shaped expansion area or dome-shaped expansion area. This half-spherical shaped expansion area or dome-shaped expansion area causes fluid flowing there through to experience chaotic mixing or chaotic advection, whereas without this half-spherical shaped expansion area or dome-shaped expansion area, fluid flowing there through would not experience chaotic mixing or chaotic advection and would only reach a laminar flow level or at best a turbulent flow level.

The ninth length of cylindrical conduit, flow channel, pipe, hose, tubing, or duct is a length of cylindrical conduit, flow channel, pipe, hose, tubing, or duct with a first end and a second end.

The tenth length of cylindrical conduit, flow channel, pipe, hose, tubing, or duct is a length of cylindrical conduit, flow channel, pipe, hose, tubing, or duct with a first end and a second end.

Sodium chlorite introduction port 11 is a port or opening to the seventh length of cylindrical conduit, flow channel, pipe, hose, tubing, or duct. Sodium chlorite introduction port 11 is a male threaded member or a female threaded member connected to the first end of the ninth length of cylindrical conduit, flow channel, pipe, hose, tubing, or duct so that fluid may freely flow between these members without leaking. Sodium chlorite introduction port 11 functions as a connection port to connect to a tank of aqueous sodium chlorite solution (not depicted) through one or more lengths of conduit, flow channel, pipe, hose, tubing, or duct (not depicted). Any known type of aqueous sodium chlorite solution may be used. Any known concentration of aqueous sodium chlorite solution may be used. Aqueous sodium chlorite solution is required for the chlorine dioxide generation device 100 to function. The act of pumping water into the input nozzle 19 causes aqueous sodium chlorite solution to flow into sodium chlorite introduction port 11.

The base end of third T-fitting/conduit with half-spherical mixing station 6 is connected to the second end of the eight length of cylindrical conduit, flow channel, pipe, hose, tubing, or duct so that fluid may freely flow between these members without leaking.

The first end of third T-fitting/conduit with half-spherical mixing station 6 is connected to the second end of the ninth length of cylindrical conduit, flow channel, pipe, hose, tubing, or duct so that fluid may freely flow between these members without leaking.

The second end of third T-fitting/conduit with half-spherical mixing station 6 is connected to the first end of the tenth length of cylindrical conduit, flow channel, pipe, hose, tubing, or duct so that fluid may freely flow between these members without leaking.

The eleventh length of cylindrical conduit, flow channel, pipe, hose, tubing, or duct is a length of cylindrical conduit, flow channel, pipe, hose, tubing, or duct with a first end and a second end.

Fourth ninety-degree fitting/conduit with two half-spherical mixing stations 7 is an elbow shaped or L-shaped fitting or section of cylindrical conduit, flow channel, pipe, hose, tubing, or duct with a ninety-degree bend. Fourth ninety-degree fitting/conduit with two half-spherical mixing stations 7 has a first end, a second end, an interior surface, and an exterior surface. Since there is a ninety-degree bend on one side, there is a two hundred seventy degree bend on the other side. The two segments of the elbow shape or L-shape on the two hundred seventy degree bend side each have a half-spherical shaped expansion area or dome-shaped expansion area on the inner surface of the cylindrical conduit, flow channel, pipe, hose, tubing, or duct to create a half-spherical concave section on the inner surface of the cylindrical conduit, flow channel, pipe, hose, tubing, or duct, as depicted. Rather than the typical straight cylindrical shaped flow channel that makes a ninety-degree bend, the two outer segments of the fourth ninety-degree fitting/conduit with two half-spherical mixing stations 7 each have a half-spherical shaped expansion area or dome-shaped expansion area. These two half-spherical shaped expansion areas or dome-shaped expansion areas cause fluid flowing there through to experience chaotic mixing or chaotic advection, whereas without these two half-spherical shaped expansion areas or dome-shaped expansion areas, fluid flowing there through would not experience chaotic mixing or chaotic advection and would only reach a laminar flow level or at best a turbulent flow level.

The first end of the fourth ninety-degree fitting/conduit with two half-spherical mixing stations 7 is connected to the second end of the tenth length of cylindrical conduit, flow channel, pipe, hose, tubing, or duct so that fluid may freely flow between these members without leaking.

The second end of the fourth ninety-degree fitting/conduit with two half-spherical mixing stations 7 is connected to the first end of the eleventh length of cylindrical conduit, flow channel, pipe, hose, tubing, or duct so that fluid may freely flow between these members without leaking.

Fifth ninety-degree fitting/conduit with two half-spherical mixing stations 8 is an elbow shaped or L-shaped fitting or section of cylindrical conduit, flow channel, pipe, hose, tubing, or duct with a ninety-degree bend. Fifth ninety-degree fitting/conduit with two half-spherical mixing stations 8 has a first end, a second end, an interior surface, and an exterior surface. Since there is a ninety-degree bend on one side, there is a two hundred seventy degree bend on the other side. The two segments of the elbow shape or L-shape on the two hundred seventy degree bend side each have a half-spherical shaped expansion area or dome-shaped expansion area on the inner surface of the cylindrical conduit, flow channel, pipe, hose, tubing, or duct to create a half-spherical concave section on the inner surface of the cylindrical conduit, flow channel, pipe, hose, tubing, or duct, as depicted. Rather than the typical straight cylindrical shaped flow channel that makes a ninety-degree bend, the two outer segments of the fifth ninety-degree fitting/conduit with two half-spherical mixing stations 8 each have a half-spherical shaped expansion area or dome-shaped expansion area. These two half-spherical shaped expansion areas or dome-shaped expansion areas cause fluid flowing there through to experience chaotic mixing or chaotic advection, whereas without these two half-spherical shaped expansion areas or dome-shaped expansion areas, fluid flowing there through would not experience chaotic mixing or chaotic advection and would only reach a laminar flow level or at best a turbulent flow level.

The first end of the fifth ninety-degree fitting/conduit with two half-spherical mixing stations 8 is connected to the second end of the eleventh length of cylindrical conduit, flow channel, pipe, hose, tubing, or duct so that fluid may freely flow between these members without leaking.

The second end of the fifth ninety-degree fitting/conduit with two half-spherical mixing stations 8 is connected to the first end of the twelfth length of cylindrical conduit, flow channel, pipe, hose, tubing, or duct so that fluid may freely flow between these members without leaking.

Input nozzle 19 is a nozzle that tapers inward along the direction of flow and narrows into a small hole or orifice that is the input nozzle orifice 10, as depicted. Input nozzle 19 has a first end, a first cylindrical section, a conical section, a second cylindrical section, and a second end. First cylindrical section is a rigid hollow open-ended cylindrical shaped member with an inner diameter of about 1.0-10 inches. First cylindrical section has a first end and a second end. The first end of first cylindrical section is the first end of input nozzle 19. Conical section is a rigid hollow open-ended conical shaped member that tapers from an inner diameter of about 1.0-10 inches to an inner diameter of about 0.5-5 inches. Conical section has a first end and a second end. The second end of first cylindrical section is contiguous with the first end of conical section is contiguous. Second cylindrical section is a rigid hollow open-ended cylindrical shaped member with an inner diameter of about 0.5-5 inches. Second cylindrical section has a first end and a second end. The second end of conical section is contiguous with the first end of second cylindrical section. The second end of second cylindrical section is the second end of input nozzle 19.

Input nozzle orifice 10 is a small rigid hole or orifice. Input nozzle orifice 10 has an inner diameter of about 0.1-0.5 inches. Input nozzle orifice 10 has a first side and a second side. Input nozzle orifice 10 is located at the second end of Input nozzle 19. The first side of input nozzle orifice 10 is contiguous with the second end of Input nozzle 19. Water 18 is pumped into the first end input nozzle 19 to operate chlorine dioxide generation device 100. Input nozzle 19 constricts the flow of water 18 and causes the water 18 to increase in velocity as it passes through the conical section and input nozzle orifice 10. Input nozzle orifice 10 ejects water 18 into the diffuser nozzle 16. Input nozzle 19 functions as a connection port to connect to a pressurized source of water (not depicted) through one or more lengths of conduit, flow channel, pipe, hose, tubing, or duct (not depicted). As stated, water must be pumped through the chlorine dioxide generation device 100 for the device to function. Water is pumping into the device through Input nozzle 19.

Diffuser nozzle 16 is a nozzle that tapers outward along the direction of flow, as depicted. Diffuser nozzle 16 has a first end, a conical section, a cylindrical section, and a second end. Conical section is a rigid hollow open-ended conical shaped member that tapers from an inner diameter of about 0.5-5 inches to an inner diameter of about 1.0-10 inches. Conical section is contiguous with Input nozzle orifice 10. Conical section has a first end and a second end. The second input nozzle orifice 10 is contiguous with the first end of conical section. Cylindrical section is a rigid hollow open-ended cylindrical shaped member with an inner diameter of about 1.0-10 inches. Cylindrical section has a first end and a second end. The first end of first cylindrical section is contiguous with the second end of conical section. The second end of cylindrical section is the second end of diffuser nozzle 16. Diffuser nozzle 16 functions as the effluent port of the chlorine dioxide generation device 100. An aqueous solution of chlorine dioxide 15 flows out of diffuser nozzle 16. This aqueous solution of chlorine dioxide 15 is used to disinfect the food or items being processed. Diffuser nozzle 16 is connected to one or more lengths of conduit, flow channel, pipe, hose, tubing, or duct (not depicted) and plumbed to a point where it can be sprayed onto the food or items being disinfected. The act of pumping water into the input nozzle 19 causes aqueous solution of chlorine dioxide 15 to flow from the diffuser nozzle 16.

Each at least one vacuum chamber orifice 20 is port, rigid hole, or orifice in the conical section of diffuser nozzle 16. Each at least one vacuum chamber orifice 20 is has a first side and a second side. Each at least one vacuum chamber orifice 20 functions to receive or suck boiled off chlorine dioxide gas into the stream of pump fluid or water 18 flowing through the diffuser nozzle 16. Each at least one vacuum chamber orifice 20 is located at the low pressure section of the diffuser nozzle 16, downstream from the input nozzle orifice 10, on the conical section of the diffuser nozzle 16. As stated, due to the Bernoulli principle, this section is at a lower pressure than the rest of the chlorine dioxide generation device 100 and thus functions to suck in the boiled off chlorine dioxide gas into the stream of the pump fluid or water 18. The first side of each at least one vacuum chamber orifice 20 is connected to the second end of the twelfth length of cylindrical conduit, flow channel, pipe, hose, tubing, or duct so that fluid may freely flow between these members without leaking. The second side of each at least one vacuum chamber orifice 20 is connected to the conical section of the diffuser nozzle 16 so that fluid may freely flow between these members without leaking.

Optionally, chlorine dioxide generation device 100 may further comprise a vacuum chamber 9. Vacuum chamber 9 is a torus-shaped or doughnut-shaped chamber or cavity that surrounds or encircles the conical section of diffuser nozzle 16. Vacuum chamber 9 has an interior surface, an exterior surface, an inner diameter, and an outer diameter. Vacuum chamber 9 may be a conduit, flow channel, pipe, hose, tubing, or duct. Vacuum chamber 9 has an entry port and one or more exit ports.

Entry port is a port, rigid hole, or orifice located at a point on the perimeter or the outer diameter vacuum chamber 9. Entry port functions to provide access into the torus-shaped or doughnut-shaped vacuum chamber 9. Entry port is connected to the second end of the twelfth length of cylindrical conduit, flow channel, pipe, hose, tubing, or duct so that fluid may freely flow between these members without leaking. In this configuration, the one or more exit ports of vacuum chamber 9 serve as the at least one vacuum chamber orifice 20. In this configuration, each vacuum chamber orifice 20 is port, rigid hole, or orifice on the inner diameter of vacuum chamber 9. Each vacuum chamber orifice 20 is has a first side and a second side. Vacuum chamber orifices 20 function to receive or suck the boiled off chlorine dioxide gas into the stream of pump fluid or water 18 flowing through the center of the torus-shaped or doughnut-shaped chamber. Vacuum chamber orifices 20 are located at the low pressure section of the diffuser nozzle 16, downstream of the input nozzle orifice 10, on the conical section of the diffuser nozzle 16. As stated, due to the Bernoulli principle, this section is at a lower pressure than the rest of the chlorine dioxide generation device 100 and thus functions to suck in the boiled off chlorine dioxide gas into the stream of the pump fluid or water 18. In this configuration, the first side of each vacuum chamber orifice 20 is connected to the interior surface of vacuum chamber 9 so that fluid may freely flow between these members without leaking. The second side of each vacuum chamber orifice 20 is connected to the conical section of the diffuser nozzle 16 so that fluid may freely flow between these members without leaking.

Optionally, vacuum chamber 9 may further comprise a vacuum monitor port 17. Vacuum monitor port 17 is a port or opening at a point on the perimeter or the outer diameter vacuum chamber 9 that is opposite from the entry port. Vacuum monitor port 17 functions to connect to a vacuum monitor gauge (not depicted). Vacuum monitor port 17 is a male or female tapped hole or pipe connection. A vacuum monitor or gauge is connected to vacuum monitor port 17 in order to continuously read the vacuum pressure at this location wherein this reading is used to help control or adjust the flow of water 18 through the Venturi pump in order to yield and hold the desired vacuum pressure in the vacuum chamber 9. The vacuum pressure reading at the vacuum monitor port 17 is the vacuum pressure in the vacuum chamber 9.

The process of using chlorine dioxide generation device 100 to generate chlorine dioxide aqueous solution 15 comprises the steps of: obtaining a chlorine dioxide generation device 100 as describe above; connecting or plumbing the sodium chlorite introduction port 11 to an aqueous solution of sodium chlorite; connecting or plumbing the sodium hypochlorite introduction port 12 to an aqueous solution of sodium hypochlorite; connecting or plumbing the acid introduction port 13 to an aqueous solution of acid; connecting or plumbing the input nozzle 19 to a water pump that is connected to a water source; connecting or plumbing the diffuser nozzle 16 to an effluent line, pipe, or hose; and turning on the water pump to pump water through the chlorine dioxide generation device 100, thereby causing an aqueous solution of sodium dioxide to flow into the effluent line, pipe, or hose.

What is claimed is:

1. A chlorine dioxide generation device comprising: a sodium hypochlorite introduction port; a first length of cylindrical conduit, flow channel, pipe, hose, tubing, or duct; a first ninety-degree fitting/conduit with two half-spherical mixing stations; a second length of cylindrical conduit, flow channel, pipe, hose, tubing, or duct; an acid introduction port; a third length of cylindrical conduit, flow channel, pipe, hose, tubing, or duct; a first T-fitting/conduit with half-spherical mixing station; a fourth length of cylindrical conduit, flow channel, pipe, hose, tubing, or duct; a second ninety-degree fitting/conduit with two half-spherical mixing stations; a fifth length of cylindrical conduit, flow channel, pipe, hose, tubing, or duct; a third ninety-fitting/conduit with two half-spherical mixing stations; a sixth length of cylindrical conduit, flow channel, pipe, hose, tubing, or duct; a second T-fitting/conduit with half-spherical mixing station; a seventh length of cylindrical conduit, flow channel, pipe, hose, tubing, or duct; a testing/service port; an eighth length of cylindrical conduit, flow channel, pipe, hose, tubing, or duct; a third T-fitting/conduit with half-spherical mixing station; a ninth length of cylindrical conduit, flow channel, pipe, hose, tubing, or duct; a sodium chlorite introduction port; a tenth length of cylindrical conduit, flow channel, pipe, hose, tubing, or duct; a fourth ninety-degree fitting/conduit with two half-spherical mixing station; an eleventh length of cylindrical conduit, flow channel, pipe, hose, tubing, or duct; a fifth ninety-degree fitting/conduit with two half-spherical mixing station; an input nozzle; input nozzle orifice; a diffuser nozzle; and at least one vacuum chamber orifice; wherein,
  said first length of cylindrical conduit, flow channel, pipe, hose, tubing, or duct is a length of cylindrical conduit, flow channel, pipe, hose, tubing, or duct with a first end and a second end,
  said sodium hypochlorite introduction port is a port or opening to said first length of cylindrical conduit, flow channel, pipe, hose, tubing, or duct,
  said sodium hypochlorite introduction port is a male threaded member or a female threaded member connected to said first end of said first length of cylindrical conduit, flow channel, pipe, hose, tubing, or duct so that fluid may freely flow between these members without leaking,
  said first ninety-degree fitting/conduit with two half-spherical mixing stations is an elbow shaped or L-shaped fitting or section of cylindrical conduit, flow channel, pipe, hose, tubing, or duct with a ninety-degree bend,
  said first ninety-degree fitting/conduit with two half-spherical mixing stations has: a first end, a second end, an interior surface, and an exterior surface,
  said inner surface of said first ninety-degree fitting/conduit with two half-spherical mixing stations has at least two half-spherical concave sections, wherein each of said at least two half-spherical concave sections is a half-spherical shaped expansion area or dome-shaped expansion area in said inner surface of said first ninety-degree fitting/conduit with two half-spherical mixing stations,
  said second length of cylindrical conduit, flow channel, pipe, hose, tubing, or duct is a length of cylindrical conduit, flow channel, pipe, hose, tubing, or duct with a first end and a second end,
  said first end of said first ninety-degree fitting/conduit with two half-spherical mixing stations is connected to said second end of said first length of cylindrical conduit, flow channel, pipe, hose, tubing, or duct so that fluid may freely flow between these members without leaking,
  said second end of said first ninety-degree fitting/conduit with two half-spherical mixing stations is connected to the first end of the second length of cylindrical conduit, flow channel, pipe, hose, tubing, or duct so that fluid may freely flow between these members without leaking,
  said acid introduction port is a port or opening to said third length of cylindrical conduit, flow channel, pipe, hose, tubing, or duct,
  said third length of cylindrical conduit, flow channel, pipe, hose, tubing, or duct is a length of cylindrical conduit, flow channel, pipe, hose, tubing, or duct with a first end and a second end,
  said acid introduction port is a male threaded member or a female threaded member connected to said first end of said third length of cylindrical conduit, flow channel, pipe, hose, tubing, or duct so that fluid may freely flow between these members without leaking,
  said first T-fitting/conduit with half-spherical mixing station is a T-shaped fitting or section of cylindrical conduit, flow channel, pipe, hose, tubing, or duct with a base end, a first end, a second end, an interior surface, and an exterior surface,
  said inner surface of said first T-fitting/conduit with half-spherical mixing station has at least one half-spherical concave section, wherein each of said at least one half-spherical concave section is a half-spherical shaped expansion area or dome-shaped expansion area in said inner surface of said first T-fitting/conduit with half-spherical mixing station,
  said fourth length of cylindrical conduit, flow channel, pipe, hose, tubing, or duct is a length of cylindrical conduit, flow channel, pipe, hose, tubing, or duct with a first end and a second end,
  said base end of said first T-fitting/conduit with half-spherical mixing station is connected to said second end of said second length of cylindrical conduit, flow channel, pipe, hose, tubing, or duct so that fluid may freely flow between these members without leaking,
  said first end of said first T-fitting/conduit with half-spherical mixing station is connected to said first end of said fourth length of cylindrical conduit, flow channel, pipe, hose, tubing, or duct so that fluid may freely flow between these members without leaking,
  said second end of said first T-fitting/conduit with half-spherical mixing station is connected to said second end of said third length of cylindrical conduit, flow channel, pipe, hose, tubing, or duct so that fluid may freely flow between these members without leaking,
  said second ninety-degree fitting/conduit with two half-spherical mixing stations is an elbow shaped or L-shaped fitting or section of cylindrical conduit, flow channel, pipe, hose, tubing, or duct with a ninety-degree bend, said second ninety-degree fitting/conduit with two half-spherical mixing stations has a first end, a second end, an interior surface, and an exterior surface, said inner surface of said second ninety-degree fitting/conduit with two half-spherical mixing stations has at least two half-spherical concave sections, wherein each of said at least two half-spherical concave sections is a half-spherical shaped expansion area or dome-shaped expansion area in said inner surface of said second ninety-degree fitting/conduit with two half-spherical mixing stations, said fifth length of cylindrical conduit, flow channel, pipe, hose, tubing, or duct is a length of cylindrical conduit, flow channel, pipe, hose, tubing, or duct with a first end and a second end, said first end of said second ninety-degree fitting/conduit with two half-spherical mixing stations is connected to said second end of said fourth length of cylindrical conduit, flow channel, pipe, hose, tubing, or duct so that fluid may freely flow between these members without leaking, said second end of said second ninety-degree fitting/conduit with two half-spherical mixing stations is connected to said first end of said fifth length of cylindrical conduit, flow channel, pipe, hose, tubing, or duct so that fluid may freely flow between these members without leaking, said third ninety-degree fitting/conduit with two half-spherical mixing stations is an elbow shaped or L-shaped fitting or section of cylindrical conduit, flow channel, pipe, hose, tubing, or duct with a ninety-degree bend, said third ninety-degree fitting/conduit with two half-spherical mixing stations has a first end, a second end, an interior surface, and an exterior surface, said inner surface of said third ninety-degree fitting/conduit with two half-spherical mixing stations has at least two half-spherical concave sections, wherein each of said at least two half-spherical concave sections is a half-spherical shaped expansion area or dome-shaped expansion area in said inner surface of said third ninety-degree fitting/conduit with two half-spherical mixing stations, said sixth length of cylindrical conduit, flow channel, pipe, hose, tubing, or duct is a length of cylindrical conduit, flow channel, pipe, hose, tubing, or duct with a first end and a second end, said first end of said third ninety-degree fitting/conduit with two half-spherical mixing stations is connected to said second end of said fifth length of cylindrical conduit, flow channel, pipe, hose, tubing, or duct so that fluid may freely flow between these members without leaking, said second end of said third ninety-degree fitting/conduit with two half-spherical mixing stations is connected to said first end of said sixth length of cylindrical conduit, flow channel, pipe, hose, tubing, or duct so that fluid may freely flow between these members without leaking, said second T-fitting/conduit with half-spherical mixing station is a T-shaped fitting or section of cylindrical conduit, flow channel, pipe, hose, tubing, or duct with a base end, a first end, a second end, an interior surface, and an exterior surface, said inner surface of said second T-fitting/conduit with half-spherical mixing station has at least one half-spherical concave section, wherein each of said at least one half-spherical concave section is a half-spherical shaped expansion area or dome-shaped expansion area in said inner surface of said second T-fitting/conduit with half-spherical mixing station, said seventh length of cylindrical conduit, flow channel, pipe, hose, tubing, or duct is a length of cylindrical conduit, flow channel, pipe, hose, tubing, or duct with a first end and a second end, said eight length of cylindrical conduit, flow channel, pipe, hose, tubing, or duct is a length of cylindrical conduit, flow channel, pipe, hose, tubing, or duct with a first end and a second end, said testing/service port is a port or opening to said seventh length of cylindrical conduit, flow channel, pipe, hose, tubing, or duct, said testing/service port is a male threaded member or a female threaded member connected to said first end of said seventh length of cylindrical conduit, flow channel, pipe, hose, tubing, or duct so that fluid may freely flow between these members without leaking, said base end of said second T-fitting/conduit with half-spherical mixing station is connected to said first end of said eight length of cylindrical conduit, flow channel, pipe, hose, tubing, or duct so that fluid may freely flow between these members without leaking, said first end of said second T-fitting/conduit with half-spherical mixing station is connected to said second end of said sixth length of cylindrical conduit, flow channel, pipe, hose, tubing, or duct so that fluid may freely flow between these members without leaking, said second end of said second T-fitting/conduit with half-spherical mixing station is connected to said second end of said seventh length of cylindrical conduit, flow channel, pipe, hose, tubing, or duct so that fluid may freely flow between these members without leaking, said third T-fitting/conduit with half-spherical mixing station is a T-shaped fitting or section of cylindrical conduit, flow channel, pipe, hose, tubing, or duct with a base end, a first end, a second end, an interior surface, and an exterior surface, said inner surface of said third T-fitting/conduit with half-spherical mixing station has at least one half-spherical concave section, wherein each of said at least one half-spherical concave section is a half-spherical shaped expansion area or dome-shaped expansion area in said inner surface of said third T-fitting/conduit with half-spherical mixing station, said ninth length of cylindrical conduit, flow channel, pipe, hose, tubing, or duct is a length of cylindrical conduit, flow channel, pipe, hose, tubing, or duct with a first end and a second end, said tenth length of cylindrical conduit, flow channel, pipe, hose, tubing, or duct is a length of cylindrical conduit, flow channel, pipe, hose, tubing, or duct with a first end and a second end, said sodium chlorite introduction port is a port or opening to said seventh length of cylindrical conduit, flow channel, pipe, hose, tubing, or duct, said sodium chlorite introduction port is a male threaded member or a female threaded member connected to said first end of said ninth length of cylindrical conduit, flow channel, pipe, hose, tubing, or duct so that fluid may freely flow between these members without leaking, said base end of said third T-fitting/conduit with half-spherical mixing station is connected to said second end of said eight length of cylindrical conduit, flow channel, pipe, hose, tubing, or duct so that fluid may freely flow between these members without leaking, said first end of said third T-fitting/conduit with half-spherical mixing station is connected to said second end of said ninth length of cylindrical conduit, flow channel, pipe, hose, tubing, or duct so that fluid may freely flow between these members without leaking, said second end of said third T-fitting/conduit with half-spherical mixing station is connected to said first end of said tenth length of cylindrical conduit, flow channel, pipe, hose, tubing, or duct so that fluid may freely flow between these members without leaking, said eleventh length of cylindrical conduit, flow channel, pipe, hose, tubing, or duct is a length of cylindrical conduit, flow channel, pipe, hose, tubing, or duct with a first end and a second end, said fourth ninety-degree fitting/conduit with two half-spherical mixing stations is an elbow shaped or L-shaped fitting or section of cylindrical conduit, flow channel, pipe, hose, tubing, or duct with a ninety-degree bend, said fourth ninety-degree fitting/conduit with two half-spherical mixing stations has a first end, a second end, an interior surface, and an exterior surface, said inner surface of said fourth ninety-degree fitting/conduit with two half-spherical mixing stations has at least two half-spherical concave sections, wherein each of said at least two half-spherical concave sections is a half-spherical shaped expansion area or dome-shaped expansion area in said inner surface of said fourth ninety-degree fitting/conduit with two half-spherical mixing stations, said first end of said fourth ninety-degree fitting/conduit with two half-spherical mixing stations is connected to said second end of the tenth length of cylindrical conduit, flow channel, pipe, hose, tubing, or duct so that fluid may freely flow between these members without leaking, said second end of said fourth ninety-degree fitting/conduit with two half-spherical mixing stations is connected to said first end of said eleventh length of cylindrical conduit, flow channel, pipe, hose, tubing, or duct so that fluid may freely flow between these members without leaking, said fifth ninety-degree fitting/conduit with two half-spherical mixing stations is an elbow shaped or L-shaped fitting or section of cylindrical conduit, flow channel, pipe, hose, tubing, or duct with a ninety-degree bend, said fifth ninety-degree fitting/conduit with two half-spherical mixing stations has a first end, a second end, an interior surface, and an exterior surface, said inner surface of said fifth ninety-degree fitting/conduit with two half-spherical mixing stations has at least two half-spherical concave sections, wherein each of said at least two half-spherical concave sections is a half-spherical shaped expansion area or dome-shaped expansion area in said inner surface of said fifth ninety-degree fitting/conduit with two half-spherical mixing stations, said first end of said fifth ninety-degree fitting/conduit with two half-spherical mixing stations is connected to said second end of said eleventh length of cylindrical conduit, flow channel, pipe, hose, tubing, or duct so that fluid may freely flow between these members without leaking, said second end of said fifth ninety-degree fitting/conduit with two half-spherical mixing stations is connected to said first end of said twelfth length of cylindrical conduit, flow channel, pipe, hose, tubing, or duct so that fluid may freely flow between these members without leaking, said input nozzle has a first end, a first cylindrical section, a conical section, a second cylindrical section, and a second end, wherein,
    said first cylindrical section is a rigid hollow open-ended cylindrical shaped member with a first end, a second end, and an inner diameter,
    said conical section is a rigid hollow open-ended conical shaped member with a first end, a second end,
    said conical section tapers inward from a larger diameter at said first end to a smaller diameter at said second end,
    said second end of said first cylindrical section is contiguous with said first end of said conical section,
    said second cylindrical section is a rigid hollow open-ended cylindrical shaped member with a first end, a second end, and an inner diameter,
    said second end of said conical section is contiguous with said first end of said second cylindrical section, said input nozzle orifice is a hole or orifice with a diameter smaller than said smaller diameter of said input nozzle,
    said input nozzle orifice has a first side and a second side,
    said input nozzle orifice is located at said second end of said input nozzle,
    said second end of said second cylindrical section is contiguous with said first side of said input nozzle orifice, said diffuser nozzle has a first end, a conical section, a cylindrical section, and a second end, wherein,
    said conical section is a rigid hollow open-ended conical shaped member with a first end, a second end, and an inner diameter,
    said conical section is a rigid hollow open-ended conical shaped member with a first end, a second end,
    said conical section tapers outward from a smaller diameter at said first end to a larger diameter at said second end,
    said second side of said input nozzle orifice is contiguous with said first end of said conical section,
    said cylindrical section is a rigid hollow open-ended cylindrical shaped member with a first end, a second end, and an inner diameter,
    said second end of said conical section is contiguous with said first end of said cylindrical section, each said at least one vacuum chamber orifice is a port, rigid hole, or orifice in said conical section of said diffuser nozzle,
    each said at least one vacuum chamber orifice has a first side and a second side,
    each said at least one vacuum chamber orifice is located on said conical section of said diffuser nozzle,
    said first side of each said at least one vacuum chamber orifice is connected to said second end of said twelfth length of cylindrical conduit, flow channel, pipe, hose, tubing, or duct so that fluid may freely flow between these members without leaking, and
    said second side of each said at least one vacuum chamber orifice is connected to said conical section of said diffuser nozzle so that fluid may freely flow between these members without leaking.

2. The process of using a chlorine dioxide generation device to generate chlorine dioxide aqueous solution comprising the steps of:
- obtaining a chlorine dioxide generation device as recited in claim 1;
- connecting or plumbing said sodium chlorite introduction port to an aqueous solution of sodium chlorite;
- connecting or plumbing said sodium hypochlorite introduction port to an aqueous solution of sodium hypochlorite;
- connecting or plumbing said acid introduction port to an aqueous solution of acid;
- connecting or plumbing said input nozzle to a water pump that is connected to a water source;
- connecting or plumbing said diffuser nozzle to an effluent line, pipe, or hose; and
- turning on said water pump to pump said water source through said chlorine dioxide generation device, thereby causing an aqueous solution of sodium dioxide to flow into said effluent line, pipe, or hose.

3. A chlorine dioxide generation device comprising: a sodium hypochlorite introduction port; a first length of cylindrical conduit, flow channel, pipe, hose, tubing, or duct; a first ninety-degree fitting/conduit with two half-spherical mixing stations; a second length of cylindrical conduit, flow channel, pipe, hose, tubing, or duct; an acid introduction port; a third length of cylindrical conduit, flow channel, pipe, hose, tubing, or duct; a first T-fitting/conduit with half-spherical mixing station; a fourth length of cylindrical conduit, flow channel, pipe, hose, tubing, or duct; a second ninety-degree fitting/conduit with two half-spherical mixing stations; a fifth length of cylindrical conduit, flow channel, pipe, hose, tubing, or duct; a third ninety-fitting/conduit with two half-spherical mixing stations; a sixth length of cylindrical conduit, flow channel, pipe, hose, tubing, or duct; a second T-fitting/conduit with half-spherical mixing station; a seventh length of cylindrical conduit, flow channel, pipe, hose, tubing, or duct; a testing/service port; an eighth length of cylindrical conduit, flow channel, pipe, hose, tubing, or duct; a third T-fitting/conduit with half-spherical mixing station; a ninth length of cylindrical conduit, flow channel, pipe, hose, tubing, or duct; a sodium chlorite introduction port; a tenth length of cylindrical conduit, flow channel, pipe, hose, tubing, or duct; a fourth ninety-degree fitting/conduit with two half-spherical mixing station; an eleventh length of cylindrical conduit, flow channel, pipe, hose, tubing, or duct; a fifth ninety-degree fitting/conduit with two half-spherical mixing station; an input nozzle; input nozzle orifice; a diffuser nozzle; and a vacuum chamber; wherein, said first length of cylindrical conduit, flow channel, pipe, hose, tubing, or duct is a length of cylindrical conduit, flow channel, pipe, hose, tubing, or duct with a first end and a second end, said sodium hypochlorite introduction port is a port or opening to said first length of cylindrical conduit, flow channel, pipe, hose, tubing, or duct, said sodium hypochlorite introduction port is a male threaded member or a female threaded member connected to said first end of said first length of cylindrical conduit, flow channel, pipe, hose, tubing, or duct so that fluid may freely flow between these members without leaking, said first ninety-degree fitting/conduit with two half-spherical mixing stations is an elbow shaped or L-shaped fitting or section of cylindrical conduit, flow channel, pipe, hose, tubing, or duct with a ninety-degree bend, said first ninety-degree fitting/conduit with two half-spherical mixing stations has: a first end, a second end, an interior surface, and an exterior surface, said inner surface of said first ninety-degree fitting/conduit with two half-spherical mixing stations has at least two half-spherical concave sections, wherein each of said at least two half-spherical concave sections is a half-spherical shaped expansion area or dome-shaped expansion area in said inner surface of said first ninety-degree fitting/conduit with two half-spherical mixing stations, said second length of cylindrical conduit, flow channel, pipe, hose, tubing, or duct is a length of cylindrical conduit, flow channel, pipe, hose, tubing, or duct with a first end and a second end, said first end of said first ninety-degree fitting/conduit with two half-spherical mixing stations is connected to said second end of said first length of cylindrical conduit, flow channel, pipe, hose, tubing, or duct so that fluid may freely flow between these members without leaking, said second end of said first ninety-degree fitting/conduit with two half-spherical mixing stations is connected to the first end of the second length of cylindrical conduit, flow channel, pipe, hose, tubing, or duct so that fluid may freely flow between these members without leaking, said acid introduction port is a port or opening to said third length of cylindrical conduit, flow channel, pipe, hose, tubing, or duct, said third length of cylindrical conduit, flow channel, pipe, hose, tubing, or duct is a length of cylindrical conduit, flow channel, pipe, hose, tubing, or duct with a first end and a second end, said acid introduction port is a male threaded member or a female threaded member connected to said first end of said third length of cylindrical conduit, flow channel, pipe, hose, tubing, or duct so that fluid may freely flow between these members without leaking, said first T-fitting/conduit with half-spherical mixing station is a T-shaped fitting or section of cylindrical conduit, flow channel, pipe, hose, tubing, or duct with a base end, a first end, a second end, an interior surface, and an exterior surface, said inner surface of said first T-fitting/conduit with half-spherical mixing station has at least one half-spherical concave section, wherein each of said at least one half-spherical concave section is a half-spherical shaped expansion area or dome-shaped expansion area in said inner surface of said first T-fitting/conduit with half-spherical mixing station, said fourth length of cylindrical conduit, flow channel, pipe, hose, tubing, or duct is a length of cylindrical conduit, flow channel, pipe, hose, tubing, or duct with a first end and a second end, said base end of said first T-fitting/conduit with half-spherical mixing station is connected to said second end of said second length of cylindrical conduit, flow channel, pipe, hose, tubing, or duct so that fluid may freely flow between these members without leaking, said first end of said first T-fitting/conduit with half-spherical mixing station is connected to said first end of said fourth length of cylindrical conduit, flow channel, pipe, hose, tubing, or duct so that fluid may freely flow between these members without leaking, said second end of said first T-fitting/conduit with half-spherical mixing station is connected to said second end of said third length of cylindrical conduit, flow channel, pipe, hose, tubing, or duct so that fluid may freely flow between these members without leaking, said second ninety-degree fitting/conduit with two half-spherical mixing stations is an elbow shaped or L-shaped fitting or section of cylindrical conduit, flow channel, pipe, hose, tubing, or duct with a ninety-degree bend, said second ninety-degree fitting/conduit with two half-spherical mixing stations has a first end, a second end, an interior surface, and an exterior surface, said inner surface of said second ninety-degree fitting/conduit with two half-spherical mixing stations has at least two half-spherical concave sections, wherein each of said at least two half-spherical concave sections is a half-spherical shaped expansion area or dome-shaped expansion area in said inner surface of said second ninety-degree fitting/conduit with two half-spherical mixing stations, said fifth length of cylindrical conduit, flow channel, pipe, hose, tubing, or duct is a length of cylindrical conduit, flow channel, pipe, hose, tubing, or duct with a first end and a second end, said first end of said second ninety-degree fitting/conduit with two half-spherical mixing stations is connected to said second end of said fourth length of cylindrical conduit, flow channel, pipe, hose, tubing, or duct so that fluid may freely flow between these members without leaking, said second end of said second ninety-degree fitting/conduit with two half-spherical mixing stations is connected to said first end of said fifth length of cylindrical conduit, flow channel, pipe, hose, tubing, or duct so that fluid may freely flow between these members without leaking, said third ninety-degree fitting/conduit with two half-spherical mixing stations is an elbow shaped or L-shaped fitting or section of cylindrical conduit, flow channel, pipe, hose, tubing, or duct with a ninety-degree bend, said third ninety-degree fitting/conduit with two half-spherical mixing stations has a first end, a second end, an interior surface, and an exterior surface, said inner surface of said third ninety-degree fitting/conduit with two half-spherical mixing stations has at least two half-spherical concave sections, wherein each of said at least two half-spherical concave sections is a half-spherical shaped expansion area or dome-shaped expansion area in said inner surface of said third ninety-degree fitting/conduit with two half-spherical mixing stations, said sixth length of cylindrical conduit, flow channel, pipe, hose, tubing, or duct is a length of cylindrical conduit, flow channel, pipe, hose, tubing, or duct with a first end and a second end, said first end of said third ninety-degree fitting/conduit with two half-spherical mixing stations is connected to said second end of said fifth length of cylindrical conduit, flow channel, pipe, hose, tubing, or duct so that fluid may freely flow between these members without leaking, said second end of said third ninety-degree fitting/conduit with two half-spherical mixing stations is connected to said first end of said sixth length of cylindrical conduit, flow channel, pipe, hose, tubing, or duct so that fluid may freely flow between these members without leaking, said second T-fitting/conduit with half-spherical mixing station is a T-shaped fitting or section of cylindrical conduit, flow channel, pipe, hose, tubing, or duct with a base end, a first end, a second end, an interior surface, and an exterior surface, said inner surface of said second T-fitting/conduit with half-spherical mixing station has at least one half-spherical concave section, wherein each of said at least one half-spherical concave section is a half-spherical shaped expansion area or dome-shaped expansion area in said inner surface of said second T-fitting/conduit with half-spherical mixing station, said seventh length of cylindrical conduit, flow channel, pipe, hose, tubing, or duct is a length of cylindrical conduit, flow channel, pipe, hose, tubing, or duct with a first end and a second end, said eight length of cylindrical conduit, flow channel, pipe, hose, tubing, or duct is a length of cylindrical conduit, flow channel, pipe, hose, tubing, or duct with a first end and a second end, said testing/service port is a port or opening to said seventh length of cylindrical conduit, flow channel, pipe, hose, tubing, or duct, said testing/service port is a male threaded member or a female threaded member connected to said first end of said seventh length of cylindrical conduit, flow channel, pipe, hose, tubing, or duct so that fluid may freely flow between these members without leaking, said base end of said second T-fitting/conduit with half-spherical mixing station is connected to said first end of said eight length of cylindrical conduit, flow channel, pipe, hose, tubing, or duct so that fluid may freely flow between these members without leaking, said first end of said second T-fitting/conduit with half-spherical mixing station is connected to said second end of said sixth length of cylindrical conduit, flow channel, pipe, hose, tubing, or duct so that fluid may freely flow between these members without leaking, said second end of said second T-fitting/conduit with half-spherical mixing station is connected to said second end of said seventh length of cylindrical conduit, flow channel, pipe, hose, tubing, or duct so that fluid may freely flow between these members without leaking, said third T-fitting/conduit with half-spherical mixing station is a T-shaped fitting or section of cylindrical conduit, flow channel, pipe, hose, tubing, or duct with a base end, a first end, a second end, an interior surface, and an exterior surface, said inner surface of said third T-fitting/conduit with half-spherical mixing station has at least one half-spherical concave section, wherein each of said at least one half-spherical concave section is a half-spherical shaped expansion area or dome-shaped expansion area in said inner surface of said third T-fitting/conduit with half-spherical mixing station, said ninth length of cylindrical conduit, flow channel, pipe, hose, tubing, or duct is a length of cylindrical conduit, flow channel, pipe, hose, tubing, or duct with a first end and a second end, said tenth length of cylindrical conduit, flow channel, pipe, hose, tubing, or duct is a length of cylindrical conduit, flow channel, pipe, hose, tubing, or duct with a first end and a second end, said sodium chlorite introduction port is a port or opening to said seventh length of cylindrical conduit, flow channel, pipe, hose, tubing, or duct, said sodium chlorite introduction port is a male threaded member or a female threaded member connected to said first end of said ninth length of cylindrical conduit, flow channel, pipe, hose, tubing, or duct so that fluid may freely flow between these members without leaking, said base end of said third T-fitting/conduit with half-spherical mixing station is connected to said second end of said eight length of cylindrical conduit, flow channel, pipe, hose, tubing, or duct so that fluid may freely flow between these members without leaking, said first end of said third T-fitting/conduit with half-spherical mixing station is connected to said second end of said ninth length of cylindrical conduit, flow channel, pipe, hose, tubing, or duct so that fluid may freely flow between these members without leaking, said second end of said third T-fitting/conduit with half-spherical mixing station is connected to said first end of said tenth length of cylindrical conduit, flow channel, pipe, hose, tubing, or duct so that fluid may freely flow between these members without leaking, said eleventh length of cylindrical conduit, flow channel, pipe, hose, tubing, or duct is a length of cylindrical conduit, flow channel, pipe, hose, tubing, or duct with a first end and a second end, said fourth ninety-degree fitting/conduit with two half-spherical mixing stations is an elbow shaped or L-shaped fitting or section of cylindrical conduit, flow channel, pipe, hose, tubing, or duct with a ninety-degree bend, said fourth ninety-degree fitting/conduit with two half-spherical mixing stations has a first end, a second end, an interior surface, and an exterior surface, said inner surface of said fourth ninety-degree fitting/conduit with two half-spherical mixing stations has at least two half-spherical concave sections, wherein each of said at least two half-spherical concave sections is a half-spherical shaped expansion area or dome-shaped expansion area in said inner surface of said fourth ninety-degree fitting/conduit with two half-spherical mixing stations, said first end of said fourth ninety-degree fitting/conduit with two half-spherical mixing stations is connected to said second end of the tenth length of cylindrical conduit, flow channel, pipe, hose, tubing, or duct so that fluid may freely flow between these members without leaking, said second end of said fourth ninety-degree fitting/conduit with two half-spherical mixing stations is connected to said first end of said eleventh length of cylindrical conduit, flow channel, pipe, hose, tubing, or duct so that fluid may freely flow between these members without leaking, said fifth ninety-degree fitting/conduit with two half-spherical mixing stations is an elbow shaped or L-shaped fitting or section of cylindrical conduit, flow channel, pipe, hose, tubing, or duct with a ninety-degree bend, said fifth ninety-degree fitting/conduit with two half-spherical mixing stations has a first end, a second end, an interior surface, and an exterior surface, said inner surface of said fifth ninety-degree fitting/conduit with two half-spherical mixing stations has at least two half-spherical concave sections, wherein each of said at least two half-spherical concave sections is a half-spherical shaped expansion area or dome-shaped expansion area in said inner surface of said fifth ninety-degree fitting/conduit with two half-spherical mixing stations, said first end of said fifth ninety-degree fitting/conduit with two half-spherical mixing stations is connected to said second end of said eleventh length of cylindrical conduit, flow channel, pipe, hose, tubing, or duct so that fluid may freely flow between these members without leaking, said second end of said fifth ninety-degree fitting/conduit with two half-spherical mixing stations is connected to said first end of said twelfth length of cylindrical conduit, flow channel, pipe, hose, tubing, or duct so that fluid may freely flow between these members without leaking, said input nozzle has a first end, a first cylindrical section, a conical section, a second cylindrical section, and a second end, wherein,
  said first cylindrical section is a rigid hollow open-ended cylindrical shaped member with a first end, a second end, and an inner diameter,
  said conical section is a rigid hollow open-ended conical shaped member with a first end, a second end,
  said conical section tapers inward from a larger diameter at said first end to a smaller diameter at said second end,
  said second end of said first cylindrical section is contiguous with said first end of said conical section,
  said second cylindrical section is a rigid hollow open-ended cylindrical shaped member with a first end, a second end, and an inner diameter,
  said second end of said conical section is contiguous with said first end of said second cylindrical section,
said input nozzle orifice is a hole or orifice with a diameter smaller than said smaller diameter of said input nozzle,
  said input nozzle orifice has a first side and a second side,
  said input nozzle orifice is located at said second end of said input nozzle,
  said second end of said second cylindrical section is contiguous with said first side of said input nozzle orifice,
said diffuser nozzle has a first end, a conical section, a cylindrical section, and a second end, wherein,
  said conical section is a rigid hollow open-ended conical shaped member with a first end, a second end, and an inner diameter,
  said conical section is a rigid hollow open-ended conical shaped member with a first end, a second end,
  said conical section tapers outward from a smaller diameter at said first end to a larger diameter at said second end,
  said second side of said input nozzle orifice is contiguous with said first end of said conical section,
  said cylindrical section is a rigid hollow open-ended cylindrical shaped member with a first end, a second end, and an inner diameter,
  said second end of said conical section is contiguous with said first end of said cylindrical section,
said vacuum chamber is a torus-shaped or doughnut-shaped chamber or cavity that surrounds or encircles said conical section of said diffuser nozzle,
  said vacuum chamber has an interior surface, an exterior surface, an inner diameter, an outer diameter, an entry port, and one or more exit ports, said entry port is a port, rigid hole, or orifice on said outer diameter of said vacuum chamber providing access to said vacuum chamber, said entry port is connected to said second end of said twelfth length of cylindrical conduit, flow channel, pipe, hose, tubing, or duct so that fluid may freely flow between these members without leaking, each said one or more exits ports is a port, rigid hole, or orifice on said inner diameter of said vacuum chamber, each said one or more exits ports has a first side and a second side, each said one or more exits ports is located on said conical section of said diffuser nozzle, each said first side of each said one or more exits ports is connected to the interior surface of vacuum chamber so that fluid may freely flow between these members without leaking, and each said second side of each said one or more exits ports is connected to said conical section of said diffuser nozzle so that fluid may freely flow between these members without leaking.

4. The process of using a chlorine dioxide generation device to generate chlorine dioxide aqueous solution comprising the steps of:

obtaining a chlorine dioxide generation device as recited in claim 3;

connecting or plumbing said sodium chlorite introduction port to an aqueous solution of sodium chlorite;

connecting or plumbing said sodium hypochlorite introduction port to an aqueous solution of sodium hypochlorite;

connecting or plumbing said acid introduction port to an aqueous solution of acid;

connecting or plumbing said input nozzle to a water pump that is connected to a water source;

connecting or plumbing said diffuser nozzle to an effluent line, pipe, or hose; and turning on said water pump to pump said water source through said chlorine dioxide generation device, thereby causing an aqueous solution of sodium dioxide to flow into said effluent line, pipe, or hose.

5. A chlorine dioxide generation device as recited in claim 3 further comprising: a vacuum monitor port, wherein, said vacuum monitor is a port or opening on said outer diameter of said vacuum chamber, and said vacuum monitor port is a male or female tapped hole or pipe connection to which a vacuum monitor or gauge is connected thereto.

6. The process of using a chlorine dioxide generation device to generate chlorine dioxide aqueous solution comprising the steps of:

obtaining a chlorine dioxide generation device as recited in claim 5;

connecting or plumbing said sodium chlorite introduction port to an aqueous solution of sodium chlorite;

connecting or plumbing said sodium hypochlorite introduction port to an aqueous solution of sodium hypochlorite;

connecting or plumbing said acid introduction port to an aqueous solution of acid;

connecting or plumbing said input nozzle to a water pump that is connected to a water source;

connecting or plumbing said diffuser nozzle to an effluent line, pipe, or hose; and turning on said water pump to pump said water source through said chlorine dioxide generation device, thereby causing an aqueous solution of sodium dioxide to flow into said effluent line, pipe, or hose.

* * * * *